Inventor
William E. O'Shei
By
Holcombe, Wetherill + Brisebois Attorneys

United States Patent Office 2,859,680
Patented Nov. 11, 1958

2,859,680

VENTILATING DEVICE FOR THE BODIES OF MOTOR CARS AND OTHER PASSENGER CARRYING VEHICLES

William Edward O'Shei, London, England

Application January 25, 1954, Serial No. 405,825

4 Claims. (Cl. 98—2)

The present invention relates to a ventilating device which is primarily intended for use in ventilating the sedan bodies of motor-cars but can also be used for ventilating other passenger carrying vehicles.

If a car is ventilated by opening the driver's window, the entering airstream, particularly when the vehicle is travelling at speed, causes an uncomfortable draught for the passengers in the rear seats. Louvers which hinge about vertical axes and form part of the front and/or back windows have been provided in an attempt to provide draught-free ventilation, but have not proved entirely satisfactory.

The present invention has for an object to provide a device which can be fitted to one or more of the side windows of a vehicle body to provide ventilation covering the zone of the driver or passenger adjacent to the window so fitted, whilst substantially eliminating draughts so far as the other passengers in the vehicle are concerned. For many purposes it is sufficient if only the window adjacent the driver is fitted with the ventilating device according to the invention, but to provide maximum ventilation facilities all the windows should be fitted with devices according to the invention, the driver and each of the passengers then being able to control the ventilation to meet his own requirements by simply partly opening or closing the window which is adjacent to him.

With the above objects in view, the present invention consists in a device adapted to be fitted at the top of a window frame and inside the openable top of the window, said device itself comprising or forming, in conjunction with the adjacent parts of the window frame, a substantially horizontal channel extending along the top of and inside the window and with the bottom longitudinal edge of the member spaced away from the internal surface of the window, the rear end of the channel being closed so as to deflect air which enters into the channel, when the top of the window is partly opened, downwardly across the internal surface of the window and to prevent any substantial quantity of air which enters the channel from entering the vehicle in a direction rearwardly of the channel. The rear end of the channel may be closed by a separate wall member or by the rear upright member of the window frame. Baffles may be arranged in the channel at a plurality of spaced points along its length, and according to a feature of the invention these baffles are curved in the vertical direction with their concave surfaces facing forwardly, so that air entering the channel will be deflected downwardly and forwardly across the interior surface of the window. According to a further feature of the invention the curvature of the different baffles varies from baffle to baffle, the baffles towards the rear of the channel being curved to a progressively greater extent than the forward baffles, or having their centers of curvature arranged in such positions that the rear baffles produce a greater forward deflection of the air entering the channel than the forward baffles.

By means of the ventilating device according to the invention, when the window is partly opened to an extent less than the minimum depth of the device, air passing through the window opening when the vehicle is travelling does not blow directly into the vehicle but is collected in the channel and deflected by the closed rear end of the channel, and the baffles, if provided, downwardly towards and forwardly across the internal surface of the window. This not only provides adequate ventilation for the person seated adjacent the window fitted with the device but also maintains the internal surface of the window clear of mist.

In order that the invention may be more clearly understood, reference will now be made to the accompanying drawing, in which.

Figure 1:
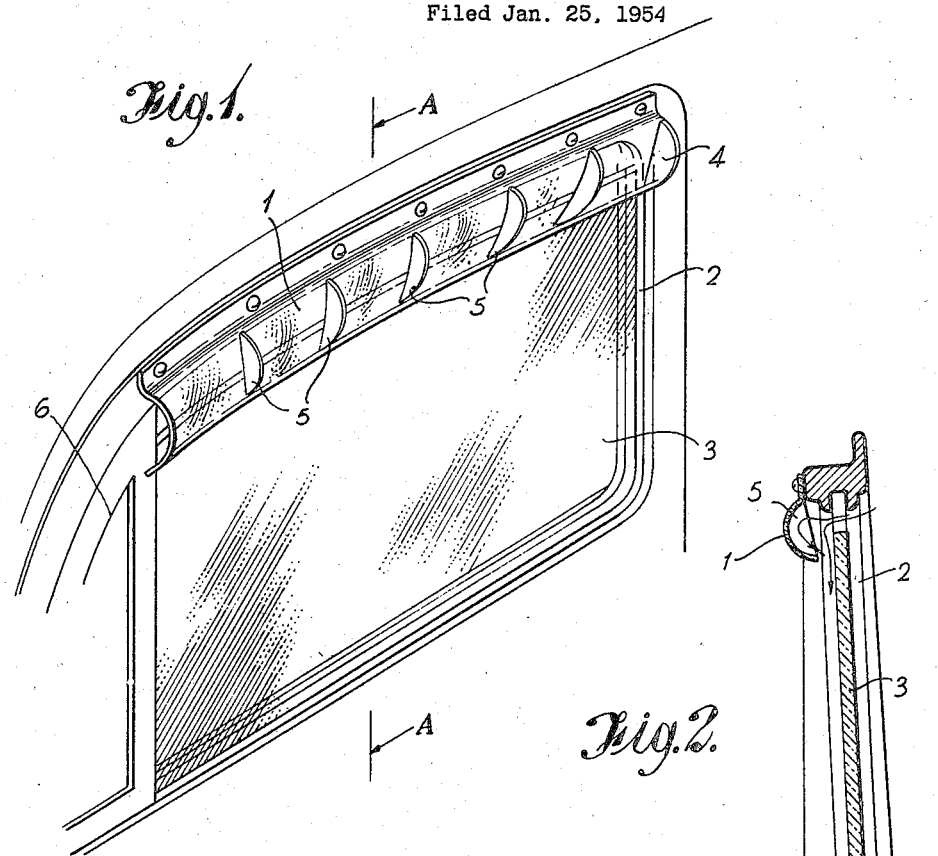
Fig. 1 is a perspective view of the device fitted to the inside of a vehicle window.
Figure 2:
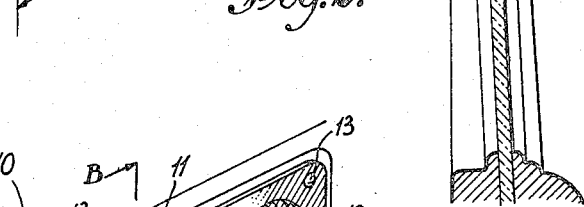
Fig. 2 is a section along the line A—A in Fig. 1.

Referring to Figs. 1 and 2 of the drawing, the device comprises a length of channel member 1 of substantially semi-circular cross-section which is arranged horizontally along the top of and at the inside of the window frame 2 in such a manner that the top longitudinal edge of the channel is secured close against the window frame whilst the bottom longitudinal edge thereof is spaced a short distance inside the window 3, for example about ⅜" away from the glass. The channel is shown as being made of transparent material. It may be mounted in position by securing its top longitudinal edge, by screws or in any other convenient manner, to the top member of the window frame. The rear end of the channel 1 is closed by an end wall 4 which may be flat as shown, or alternatively may be curved in the vertical direction with its concave surface facing forwardly. Air hitting this rear end wall 4 will be deflected thereby downwardly and forwardly across the window. At spaced points forwardly of this rear wall 4 there are fitted into the channel baffles 5 which are preferably curved with their concave surfaces facing forwardly. The baffles from front to rear may be of progressively greater curvature or have their bottom edges forwardly curved to a greater extent so that air entering the channel between the forward baffles will be deflected forwardly thereby to a less extent than by the more rearward baffles. The baffles may be spaced at distances of about 2" apart and the depth of the channel may be about 1½".

With the arrangement described the window can be opened to a depth just less than 1½" and the air forced into the vehicle by the motion of the vehicle will be collected by the ventilator channel 1 and directed downwardly and forwardly, the rear wall 4 substantially preventing air from blowing directly out of the end of the channel which is likely to cause draught to passengers seated rearwardly of the device. Air within the vehicle will be sucked out through the front end of the channel and/or through the front louver 6 if the latter be open. A quantity of fresh air will circulate within the vehicle body away from the inside of the window to provide adequate ventilation for the person sitting adjacent to the window.

The device may conveniently be made from a synthetic resin material, preferably transparent as shown, and to facilitate fitting to a vehicle it may be slightly curved from end to end, the device being flexed to a straight form by the fixing screws if it is fitted to a window with a straight top frame member or be curved to a lesser, the same or a greater extent when fitted to a window of which the top frame member is curved.

Figure 3:
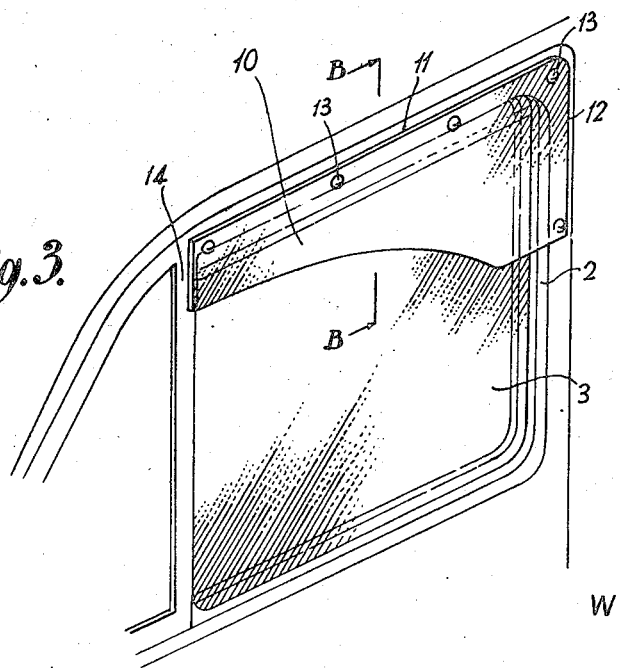
Fig. 3 is a perspective view of a modification.
Figure 4:
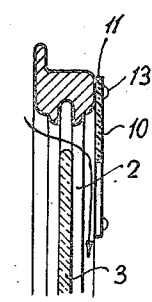
Fig. 4 is a section on the line B—B in Fig. 3.

Figs. 3 and 4 show a simplified construction in which the channel is formed by the device fitted inside the window frame in conjunction with the adjacent members of the window frame. In this embodiment the device comprises a flat member 10, preferably of transparent material such as transparent plastic or safety-glass, which is fitted to abut against the top and rear members 11 and 12 of the window frame 2, being secured thereto by screws 13 or in any other appropriate manner. The front of the member 10 may also seal against the front member of the window frame or the vertical frame member 14 of the front louvre. When fitted to the window frame of an automobile vehicle, the bottom edge of the member 10 may slope or curve downwardly from front to rear, for example the device may be about 2½" deep at its front end, about 3" deep at its centre, and then curve downwardly at the rear end to a depth of about 6", the width of the end portion being about 3".

When the vehicle is travelling, with the window 3 slightly open, air entering the channel formed by the space between the member 10 and the window 3 will be deflected downwardly and forwardly by the end wall of this channel constituted by the rear upright member 12 of the window frame and will also be deflected forwardly across the internal surface of the window and within the area occupied by the adjacent passenger. Air within the vehicle body will be extracted through the front end of the channel. This extraction at the front end makes it possible to open the window to a depth slightly greater than the depth of the device at its front end, for example to between 2½" and 3", the read part of the channel collecting the air entering the vehicle through the open window and deflecting it downwardly by its closed rear end.

With the device according to this invention, the front louver 6 need no longer be movable and may, if desired, be entirely dispensed with, adequate ventilation being afforded by opening the top of the window 3.

Each of the opening windows of the vehicle may be fitted with the device.

Whilst a particular embodiment has been described, it will be understood that various modifications may be made without departing from the scope of the invention. Thus the ventilator need not be constructed as an attachment; it can be built in as a part of the vehicle window frame. Furthermore, the depth of the device can be changed to meet requirements. It is, furthermore, not limited to its application to the ventilation of motor vehicle bodies but can be applied to the ventilation of railway carriages or other passenger vehicles. The window which is openable in front of the device need not move in a vertical direction; the device could be fitted behind small horizontal sliding window sections at the top of railway carriage windows.

I claim:

1. In a vehicle, ventilating means comprising a window frame fitted with a vertically slidable window, a plate-like member extending along and closed against the top of the window frame but extending only part way down said window frame at and between its ends, said member being coextensive with and spaced inside the plane of the window and forming a longitudinally continuous channel between the member and the window open at its upper edge to the outer air when the window is lowered slightly and with the bottom edge of the member spaced away from the internal surface of the window providing an outlet from said channel, and closure means comprising the rear upright of the window frame for closing the rear end of the channel, the lower edge of the plate-like member extending rearwardly and downwardly from the front edge on the plate-like member substantially to its rear edge.

2. In a vehicle, ventilating means comprising a window frame fitted with a vertically slidable window, a plate-like member extending along and closed against the top of the window frame but extending only part way down said window frame between its ends, said member being substantially coextensive with and spaced inside the upper part of the window and forming a longitudinally continuous channel between it and the window, said channel being open at its upper edge to the outer air when the window is slightly open, the bottom edge of said plate-like member being spaced away from the internal surface of the window providing an outlet from said channel into said vehicle, closure means comprising the rear upright of the window frame for closing the rear end of said channel thereby forming an area of the rear portion of said plate-like member extending further down said window frame than the front portion of said member and causing the pressure of the air flowing therein to build up whereby the air in said channel is caused to flow downwardly and forwardly into said vehicle.

3. Ventilating means as claimed in claim 2, wherein said rear area is of a width at least equal to the depth of said front half of the member.

4. In a vehicle, ventilating means comprising a window frame fitted with a vertically slidable window, a plate-like member extending completely along and closed against the top of the window frame but extending only part way down said window frame, said plate-like member being inside the plane of the window and forming a channel between said member and the window with the bottom edge of the member spaced away from the internal surface of the window, closure means comprising the rear upright of the window frame for closing the rear end of the channel, the lower edge of said plate-like member being continuous from end to end and curving downwardly from its front end towards the rear thereof to provide an area of the rear portion of said plate-like member having a depth below the top member of the window frame which is at least twice the depth of the plate-like member below the said top frame member at the front end thereof.

References Cited in the file of this patent

UNITED STATES PATENTS

| | | |
|---|---|---|
| 1,943,573 | Wingert | Jan. 16, 1934 |
| 2,011,667 | Wilson | Aug. 20, 1935 |
| 2,017,996 | Stonehouse | Oct. 22, 1935 |
| 2,465,345 | Elsebusch | Mar. 29, 1949 |
| 2,608,926 | Helsley | Sept. 2, 1952 |
| 2,696,154 | Eaton | Dec. 7, 1954 |

FOREIGN PATENTS

| | | |
|---|---|---|
| 738,142 | France | June 3, 1932 |